United States Patent
Watanabe (10) Patent No.: US 8,108,775 B2
(45) Date of Patent: Jan. 31, 2012

(54) OPERATION IMAGE DISPLAYING DEVICE AND RECORDING MEDIUM STORING A PROGRAM FOR DISPLAYING OPERATION IMAGE

(75) Inventor: Kazumi Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 721 days.

(21) Appl. No.: 12/196,887

(22) Filed: Aug. 22, 2008

(65) Prior Publication Data

US 2009/0055779 A1   Feb. 26, 2009

(30) Foreign Application Priority Data

Aug. 24, 2007 (JP) ................................ 2007-218497

(51) Int. Cl.
G06F 3/00 (2006.01)
G06F 9/00 (2006.01)
G06F 17/00 (2006.01)

(52) U.S. Cl. ......... 715/711; 715/708; 715/763; 715/764

(58) Field of Classification Search .................. 715/762, 715/763, 764, 765, 766, 856, 857, 858, 859, 715/864, 866, 708, 711
See application file for complete search history.

(56) References Cited

U.S. PATENT DOCUMENTS

| 5,861,867 A | 1/1999 | Ishikawa |
| 6,362,842 B1 | 3/2002 | Tahara et al. |
| 6,587,131 B1 | 7/2003 | Nakai et al. |
| 6,717,600 B2 * | 4/2004 | Dutta et al. ................. 715/862 |
| 6,795,055 B1 * | 9/2004 | Culler ........................... 345/157 |
| 7,870,511 B2 * | 1/2011 | Suzuki .......................... 715/861 |
| 2002/0075333 A1 * | 6/2002 | Dutta et al. ................. 345/862 |
| 2002/0171690 A1 | 11/2002 | Fox et al. |

FOREIGN PATENT DOCUMENTS

| EP | 0640905 | 1/1995 |
| JP | 05-342322 | 12/1993 |
| JP | 07-089734 | 4/1995 |
| JP | 08-115194 | 5/1996 |
| JP | 11-212727 | 8/1999 |
| JP | 2001-005612 | 1/2001 |
| JP | 2002-351592 | 12/2002 |

OTHER PUBLICATIONS

Notification of Reasons of Rejection for Japanese Application No. 2007-218497 mailed Jul. 7, 2009.

* cited by examiner

Primary Examiner — Tadeese Hailu
Assistant Examiner — Anita D Chaudhuri
(74) Attorney, Agent, or Firm — Banner & Witcoff, Ltd.

(57) ABSTRACT

An operation image displaying device is provided with a displaying unit configured to display an operation image including operation input areas for inputting operations commands, a pointer displaying unit configured to show a pointer, which points a position on the displaying unit in accordance with an operation of a user, a distance detecting unit configured to detect a distance between the pointer and one of the operation image and the operation input areas.

3 Claims, 10 Drawing Sheets

FIRST HELP CONTENTS TABLE

| DISTANCE BETWEEN MOUSE POINTER AND TARGET | TARGET | HELP CONTENTS |
|---|---|---|
| (1) | ENTIRE DIALOG BOX | BASIC SETTING<br>YOU CAN MAKE BASIC SETTING ON THIS SCREEN. |
| (2) | A | PAPER SIZE<br>YOU CAN SELECT PAPER SIZE AND ENVELOPE.<br>FOR PAPER SIZE, YOU CAN SET ORIGINAL SIZE. |
| (3) | a | PAPER SIZE<br>YOU CAN SELECT PAPER SIZE AND ENVELOPE.<br>FOR PAPER SIZE, YOU CAN SET DESIRED SIZE.<br>A4, B5, A5, ...<br>NOTE:<br>USABLE SIZES ARE DIFFERENT DEPENDING ON FEEDING DIRECTION |
| (2) | B | PRINT ORIENTATION<br>YOU CAN SELECT PORTRAIT OR LANDSCAPE FOR PRINT ORIENTATION |
| (3) | b | PRINT ORIENTATION<br>PRINT IN PORTRAIT MODE |
| (3) | c | PRINT ORIENTATION<br>PRINT IN LANDSCAPE MODE |
| (2) | C | FEEDING METHOD<br>YOU CAN SET PAPER TYPES. YOU CAN USE DIFFERENT PAPER TYPES FOR FIRST SHEET, AND SECOND AND LATER SHEETS. |
| (3) | d | YOU CAN SET FEEDING METHOD FOR FIRST SHEET. |
| (3) | e | YOU CAN SET FEEDING METHOD FOR SECOND AND LATER SHEETS. |

SECOND HELP CONTENTS TABLE

| DISTANCE BETWEEN MOUSE POINTER AND TARGET | TARGET | HELP CONTENTS |
|---|---|---|
| (1) | ENTIRE DIALOG BOX | BASIC SETTING<br>YOU CAN MAKE BASIC SETTING ON THIS SCREEN. LIST OF AVAILABLE FUNCTION IS INDICATED BELOW.<br>• PAPER SIZE: A4, B5, A5, ...<br>• PAPER ORIENTATION: PORTRAIT, LANDSCAPE |
| (2) | A | PAPER SIZE<br>YOU CAN SELECT PAPER SIZE AND ENVELOPE. FOR PAPER SIZE, YOU CAN SET ORIGINAL SIZE.<br>NOTE:<br>USABLE SIZES ARE DIFFERENT DEPENDING ON FEEDING DIRECTION. |
| (3) | a | PAPER SIZE<br>YOU CAN SELECT PAPER SIZE AND ENVELOPE FROM THE LIST BELOW.<br>A4: 210mm X 297mm<br>B5: 182mm X 257mm<br>A5: 148mm X 210mm<br>NOTE:<br>USABLE SIZES ARE DIFFERENT DEPENDING ON FEEDING DIRECTION.<br>SELECT FEEDING METHOD SUITABLE FOR SELECTED PAPER SIZE IN ACCORDANCE WITH FOLLOWING.<br>TRAY 1: A4, B5, A5, POSTCARD, LETTER, LEGAL<br>TRAY 2(OPTIONAL): A4, B5, A5, LETTER, LEGAL |
| (2) | B | PRINT ORIENTATION<br>YOU CAN SELECT PORTRAIT OR LANDSCAPE FOR PRINT ORIENTATION. IN PORTRAIT MODE, LONGER SIDES EXTEND VERTICALLY WHEN YOU SEE PRINTOUT. IN LANDSCAPE MODE, LONGER SIDES EXTEND HORIZONTALLY WHEN YOU SEE PRINTOUT. |
| (3) | b | PRINT ORIENTATION<br>PRINT IN PORTRAIT MODE: IN PORTRAIT, MODE, LONGER SIDES EXTEND VERTICALLY WHEN YOU SEE PRINTOUT. |
| (3) | c | PRINT ORIENTATION<br>PRINT IN LANDSCAPE MODE: IN LANDSCAPE MODE, LONGER SIDES EXTEND HORIZONTALLY WHEN YOU SEE PRINTOUT. |
| (2) | C | FEEDING METHOD<br>YOU CAN SELECT FOLLOWING FEEDING METHODS.<br>A. AUTOMATIC FEEDING<br>B. TRAY 1<br>C. MANUAL FEEDING<br>USABLE PAPER SIZES FOR EACH FEEDING METHOD ARE INDICATED BELOW.<br>TRAY 1: A4, B5, A5, POSTCARD, LETTER, LEGAL<br>MANUAL: A4, B5, A5, POSTCARD, ENVELOPE FOR FOLDED A4 PAPER, LETTER, LEGAL<br><br>YOU CAN USE DIFFERENT PAPER TYPES FOR FIRST SHEET AND SECOND AND LATER SHEETS.<br>NOTE:<br>IF AUTOMATIC FEEDING IS SELECTED, TRAY/MANUAL ARE AUTOMATICALLY DETERMINED BASED ON SHEET FEED SETTING MADE IN OPTION MENU. |
| (3) | d | FEEDING METHOD<br>YOU CAN SELECT FOLLOWING FEEDING METHODS.<br>A. AUTOMATIC FEEDING<br>B. TRAY 1<br>C. MANUAL FEEDING<br>USABLE PAPER SIZES FOR EACH FEEDING METHOD ARE INDICATED BELOW.<br>TRAY 1: A4, B5, A5, POSTCARD, LETTER, LEGAL<br>MANUAL: A4, B5, A5, POSTCARD, ENVELOPE FOR FOLDED A4 PAPER, LETTER, LEGAL<br>NOTE:<br>IF AUTOMATIC FEEDING IS SELECTED, TRAY/MANUAL ARE AUTOMATICALLY DETERMINED BASED ON SHEET FEED SETTING MADE IN OPTION MENU. |
| (3) | e | FEEDING METHOD<br>YOU CAN SELECT FOLLOWING FEEDING METHODS.<br>A. AUTOMATIC FEEDING<br>B. TRAY 1<br>C. MANUAL FEEDING<br>USABLE PAPER SIZES FOR EACH FEEDING METHOD ARE INDICATED BELOW.<br>TRAY 1: A4, B5, A5, POSTCARD, LETTER, LEGAL<br>MANUAL: A4, B5, A5, POSTCARD, ENVELOPE FOR FOLDED A4 PAPER, LETTER, LEGAL<br>NOTE:<br>IF AUTOMATIC FEEDING IS SELECTED, TRAY/MANUAL ARE AUTOMATICALLY DETERMINED BASED ON SHEET FEED SETTING MADE IN OPTION MENU. |

FIG. 9

OPERATION IMAGE DISPLAYING DEVICE AND RECORDING MEDIUM STORING A PROGRAM FOR DISPLAYING OPERATION IMAGE

CROSS-REFERENCE TO RELATED APPLICATION

This application claims priority under 35 U.S.C. §119 from Japanese Patent Application No. 2007-218497 filed on Aug. 24, 2007. The entire subject matter of the application is incorporated herein by reference.

BACKGROUND

1. Technical Field

The present invention relates to an operation image displaying device configured to display an operation image which includes operation input areas allowing a user to input operational commands. Specifically, the invention relates to the operation image displaying device which is configured such that additional information is displayed in accordance with a location or movement of a pointer operated by a user.

2. Prior Art

Conventionally, there has been known a directional image displaying device in which a desired operation can be instructed (input) when a user places a mouse pointer, within a screen of a personal computer (hereinafter, referred to as a PC), onto an icon and click the mouse on it. Further, in such a device, in accordance with a moving speed and a moving direction of the mouse pointer, a target (i.e., icon) the user intends to select is judged, and information corresponding to the target is displayed. An example of such a device is disclosed in Japanese Patent Provisional Publication No. HEI 11-212727 (hereinafter, referred to as '727 publication).

SUMMARY OF THE INVENTION

Depending on the degree of proficiency the user has, the information as displayed may be sufficient or more detailed information may be desired. However, according to '727 publication, the displayed information is the same regardless of the degree of proficiency of the user. Therefore, if the user's proficiency is relatively low, the user may not be able to judge which one of displayed buttons or icons is to be clicked. Such a problem may be solved by configuring that detailed information directed to beginners is displayed. However, in such a case, information that is unnecessary for a skilled user (e.g., information well known by may be displayed, which may lower the operability.

According to aspects of the invention, there is provided an operation image displaying device, which is provided with a displaying unit configured to display an operation image including operation input areas for inputting operations commands, a pointer displaying unit configured to show a pointer, which points a position on the displaying unit in accordance with an operation of a user, a distance detecting unit configured to detect a distance between the pointer and one of the operation image and the operation input areas, an information selecting unit configured to select information regarding the one of the operation image and the operation input areas, and an information displaying unit configured to display the information selected by the information selecting unit.

According to further aspects of the invention, there is provided a method of displaying an operation image on a device, which method includes the steps of, displaying the operation image including operation input areas for inputting operations commands, displaying a pointer, which points a position on the displaying unit, in accordance with an operation of a user, detecting a distance between the pointer and one of the operation image and the operation input areas and selecting information regarding the one of the operation image and the operation input areas, and displaying the information selected by the selecting step.

According to further aspects of the invention, there is provided a computer readable recording medium containing instructions to cause a computer to execute the above-described method of displaying an operation image on a device.

BRIEF DESCRIPTION OF THE ACCOMPANYING DRAWINGS

FIG. 9 shows a second help contents table used in the help information displaying process.

DETAILED DESCRIPTION OF THE EMBODIMENT

Hereinafter, referring to the accompanying drawings, an embodiment according to the invention will be described.

Figure 1:
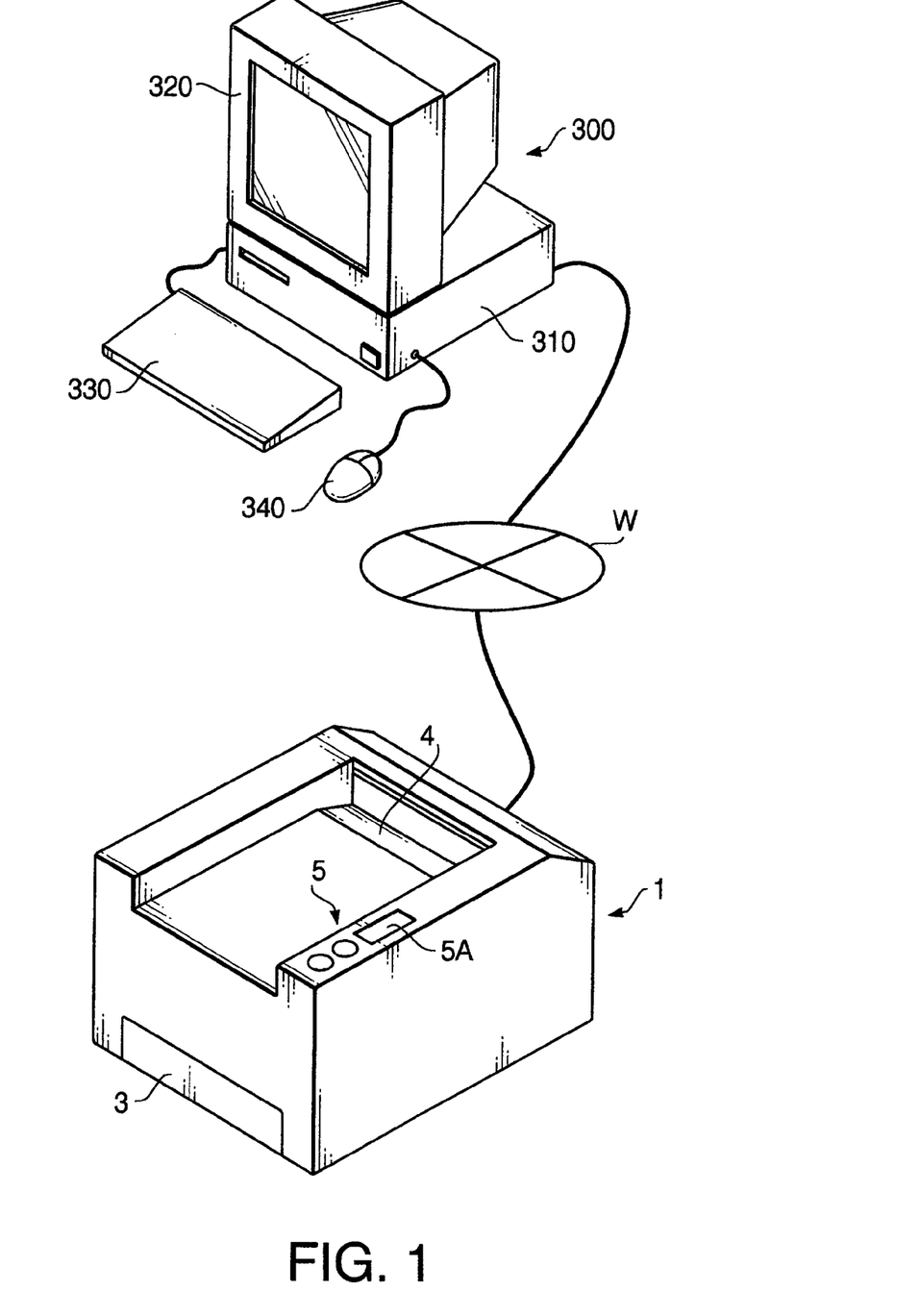
FIG. 1 is a perspective view showing an appearance of a print system according to an embodiment of the invention.

FIG. 1 is a perspective view of showing an appearance of a print system 100 according to the embodiment of the invention. As shown in FIG. 1, the print system includes a color laser printer (hereinafter, simply referred to as a printer) 1 and a personal computer (PC) 300, which functions as a device for displaying an operation screen. The printer 1 and the PC 300 are connected via a network W such as a LAN (local area network) or the Internet. According to the invention, more than one printer may be connected.

The printer 1 is provided with a well-known printer engine 2 (see FIG. 2) configured to form an image in accordance with an electrophotographic image forming method using yellow, magenta, cyan and black toners. The printer engine 2 forms images on printing sheets accommodated in a sheet tray 3 one by one, which sheets are discharged onto a stacker 4. On a surface of the printer 1, an operation panel 5, which is provided with a display 5A and a plurality of operation buttons for inputting various settings and instructions, is provided.

Figure 2:
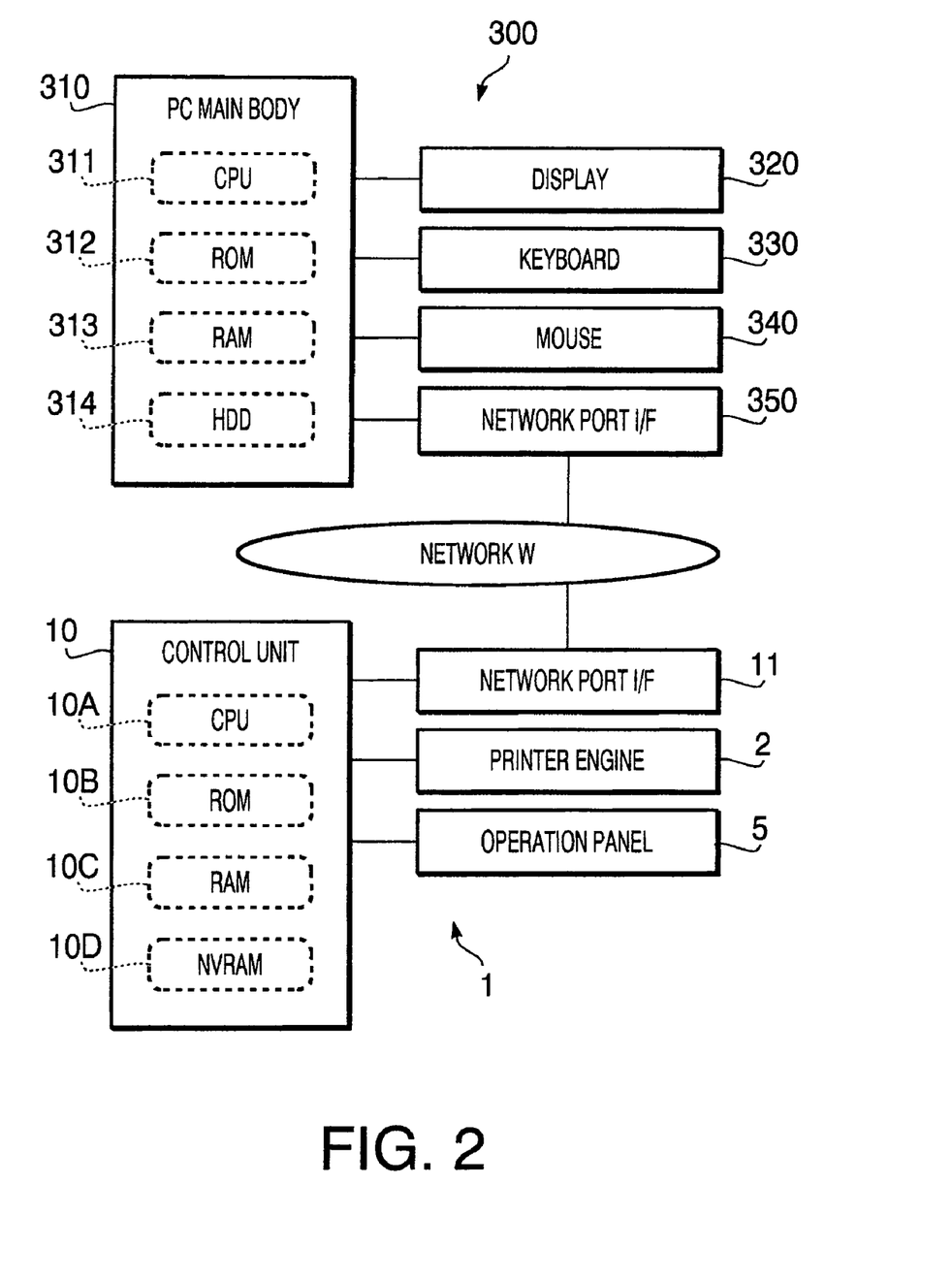
FIG. 2 is a block diagram showing a configuration of a control system of the print system shown in FIG. 1.

FIG. 2 is a block diagram showing a configuration for controlling the print system 100. As shown in FIG. 2, a main body 310 of the PC 300 is provided with a CPU (central processing unit) 311, a RON (read only memory) 312, a RAM (random access memory) 313 and an HDD (hard disk drive) 314. A display 320 such as an LCD (liquid crystal display), a keyboard 330 and a mouse 340 are connected to the main body 310 (see FIG. 1). Further, a network port I/F (interface) 350 for connecting the PC 300 to the network W is connected to the main body 310.

The printer 1 is provided with a control unit 10 for controlling the printer engine 2 and the like. The control unit 10 is configured with a micro computer including a CPU 10A, a ROM 10B and a RAM 10C. The control unit 10 also includes an NVRAM (non volatile RAM) 10D which retains stored data even if the printer 1 is powered off. Further, the control unit 10 is connected with a network port I/F 11 for connecting the printer 1 to the PC 300 via the network W.

<Control According to the Embodiment—Configuration of a Dialog

Next, processes executed by the control unit will be described.

Figure 3:
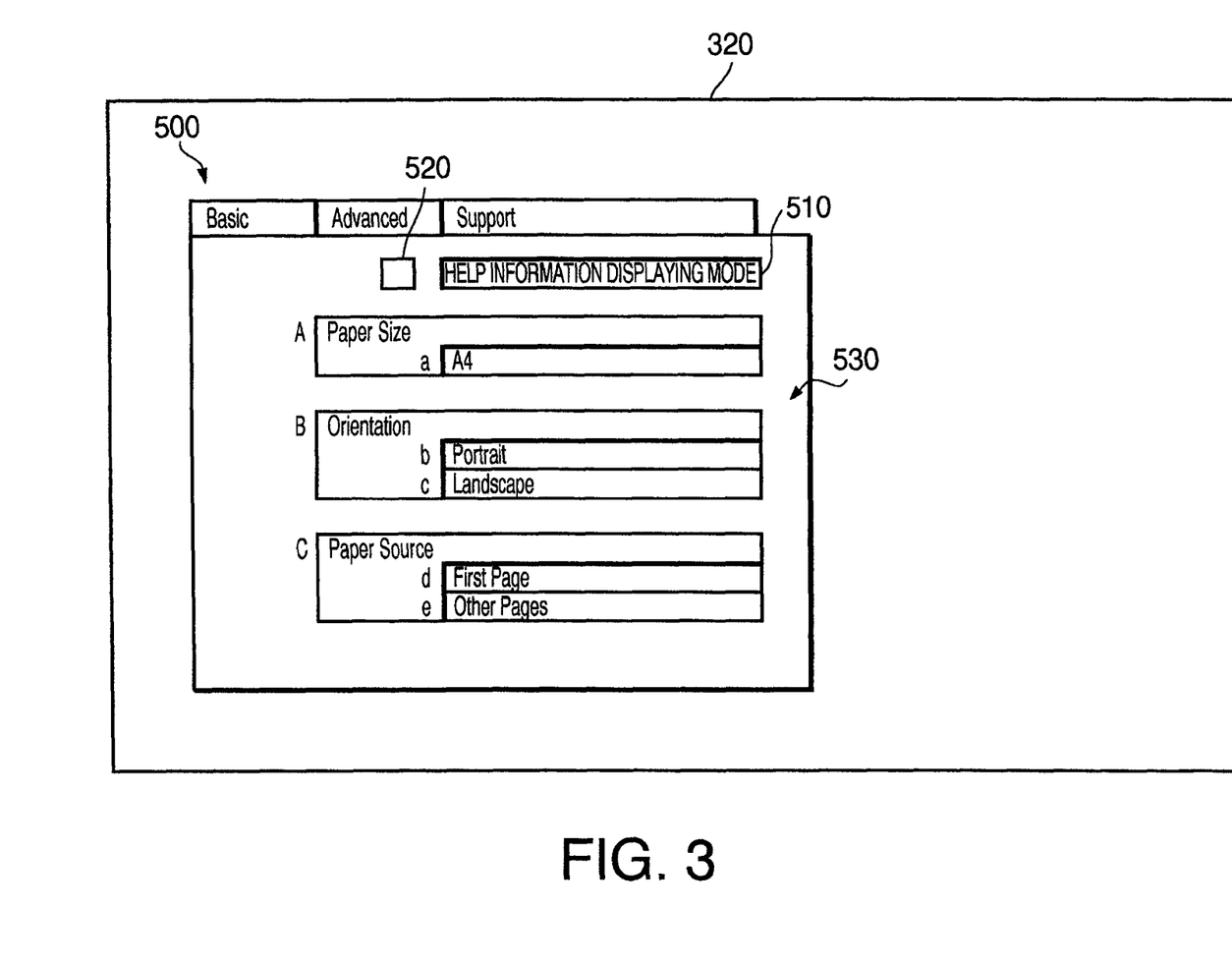
FIG. 3 shows an example of a dialog box displayed on a display unit of a personal computer of the print system shown in FIG. 1.

FIG. 3 shows an example of a dialog box 500, which is displayed on the display 320 when a printer driver is booted in the PC 300, and a "property" of the printer driver is designated by a user. Further, a mouse pointer P is also displayed so that the user operates the mouse 340 to designate a desired position on of the dialog box 500 (cf. FIG. 10). It should be noted that displaying of the dialog box 500 and the mouse pointer P is a well-known control process, and will not be described for brevity.

As shown in FIG. 3, the dialog box 500 includes a help display mode indicator 510 for indicating whether a help display mode is set or not. Next to the help display mode indicator 510, a check box 520 is provided. The help display mode is an operation mode in which help information is displayed at a position where the mouse pointer P is located. By checking/unchecking the check box 520 using the mouse 340 (i.e., clicking), the help display mode is set/unset.

Further, the dialog box 500 includes an icon display area 530 for displaying icons, which are used to execute various settings. FIG. 3 shows an example in which for setting "Basic" items (i.e., for executing basic setting). In the icon display area 530, as larger icons, A (paper size), B (orientation) and C (paper source) are displayed. In each of the larger icons, small icons are provided.

<Process Control>

Figure 4:
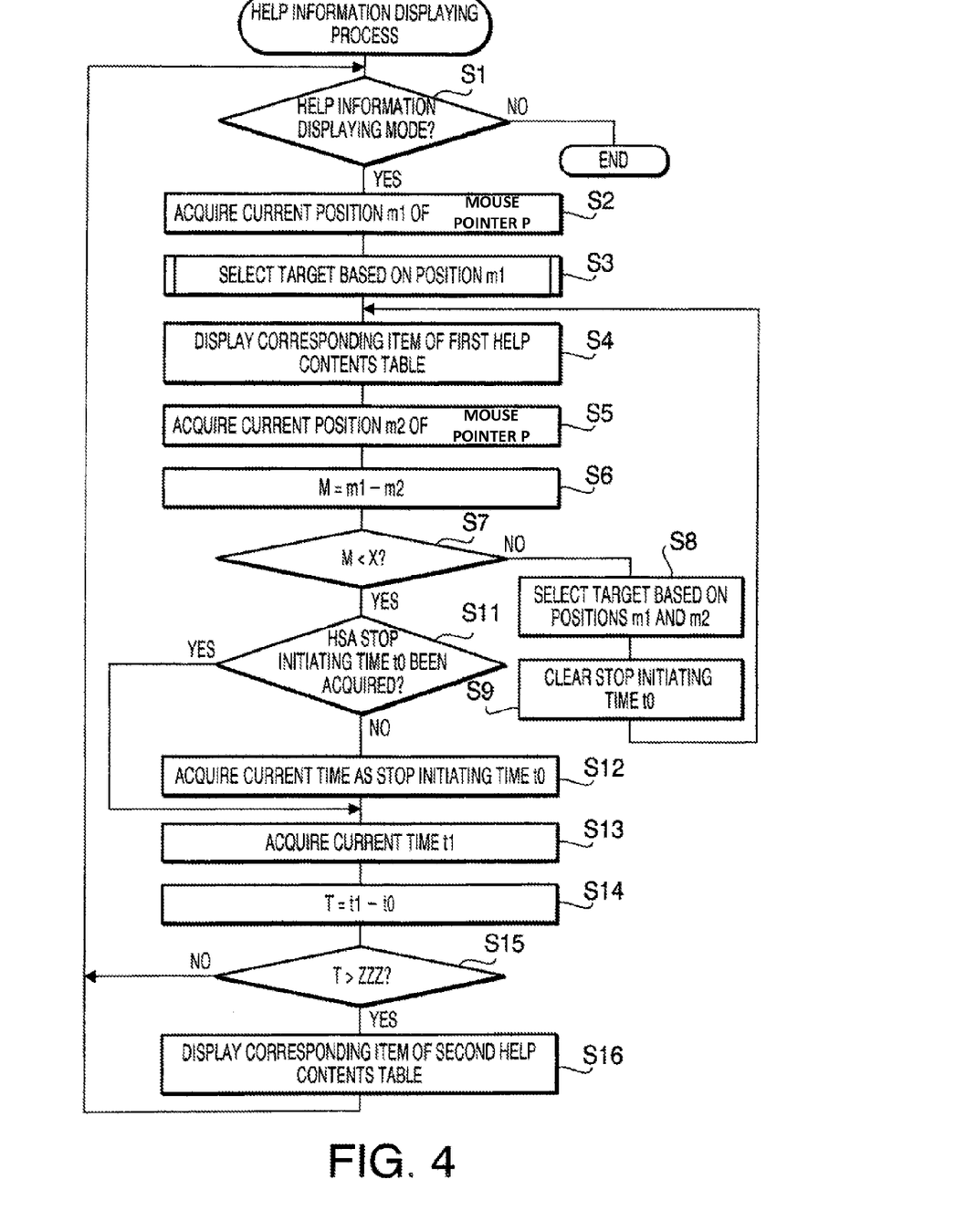
FIG. 4 is a flowchart illustrating a help information displaying process which is executed when the dialog box shown in FIG. 3 is displayed.

FIG. 4 is a flowchart illustrating a help information displaying process which is performed as the CPU 311 execute one of the program stored on the HDD 314 while the dialog box 500 is displayed.

When the help information displaying process is started, the process judges whether the help display mode is set in S1. If the help display mode is not set (S1: NO), the process is terminated. If the help display mode is set (S1: YES), the process proceeds to S2. In S2, the process acquires a position of the mouse pointer P, which position is set a variable m1. In S3, the process selects a target (icon) for which the help information is displayed based on the variable m1.

Figure 5:
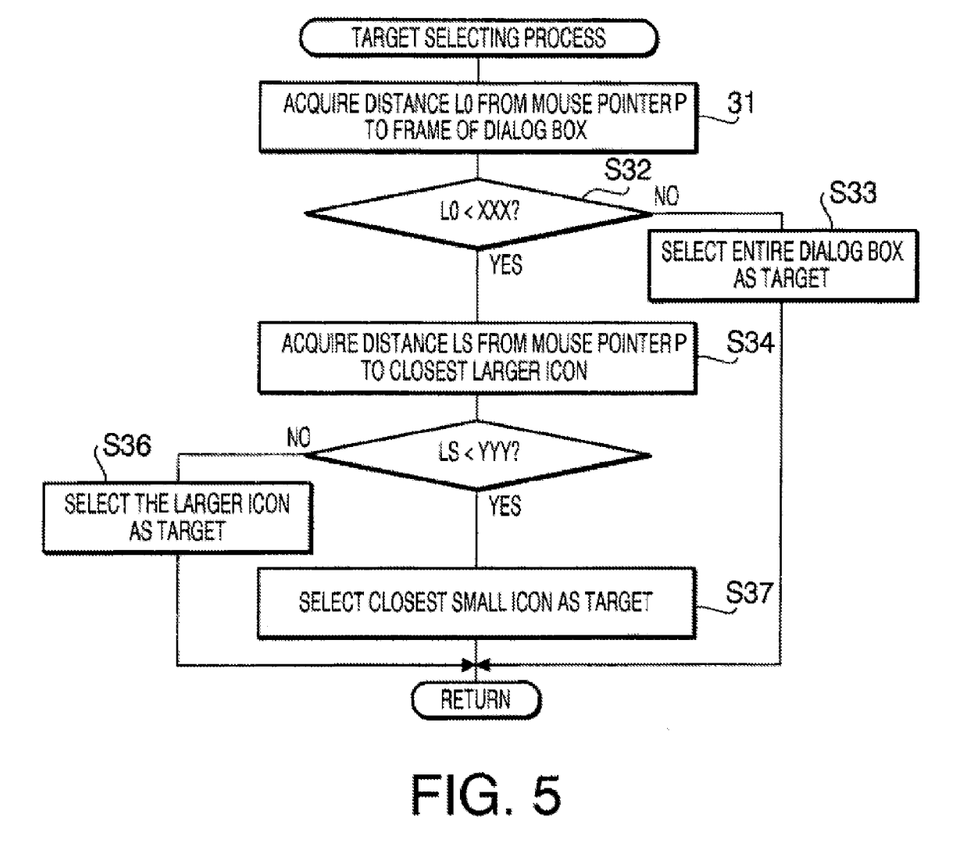
FIG. 5 is a flowchart illustrating a target selecting process in which a target is selected based on a position of a mouse pointer displayed on the display unit of the personal computer.

FIG. 5 is a flowchart illustrating a target selecting process, which is executed in S3 of FIG. 4 in detail. As shown in FIG. 5, the process firstly acquires a distance between the mouse pointer P and a frame of the dialog box 500, the acquired distance being represented by L0. In S32, the process judges whether the distance L0 is less than a fixed distance XXX, which has been determined in advance. If L0=>XXX (S32: NO), the process selects an entire dialog box 500 as the target (S33), and the process proceeds to S4 of FIG. 4.

If L0<XXX (S32: YES), e process proceeds to S34. In S34, the process acquires distances from the mouse pointer to the larger icons A, B and C, respectively, the smallest distance of three (i.e., the distance between the mouse pointer P and the closest larger icon) being represented by LS. In S35, the process judges whether the distance LS is smaller than a predetermined fixed distance YYY (YYY<XXX). If LS≧YYY (S35: NO), the process proceeds to S36, where the larger icon closest to the mouse pointer P acquired in S34 is selected as the target, and the process proceeds to S4. If LS<YYY (S35: YES), the process proceeds to S37. In S37, distances from the mouse pointer P to the small icons a-e are acquired, respectively, and then the icon corresponding to the smallest distance (i.e., the icon closest to the mouse pointer P) is selected as the target. Thereafter, the process goes to S4.

Figure 6:
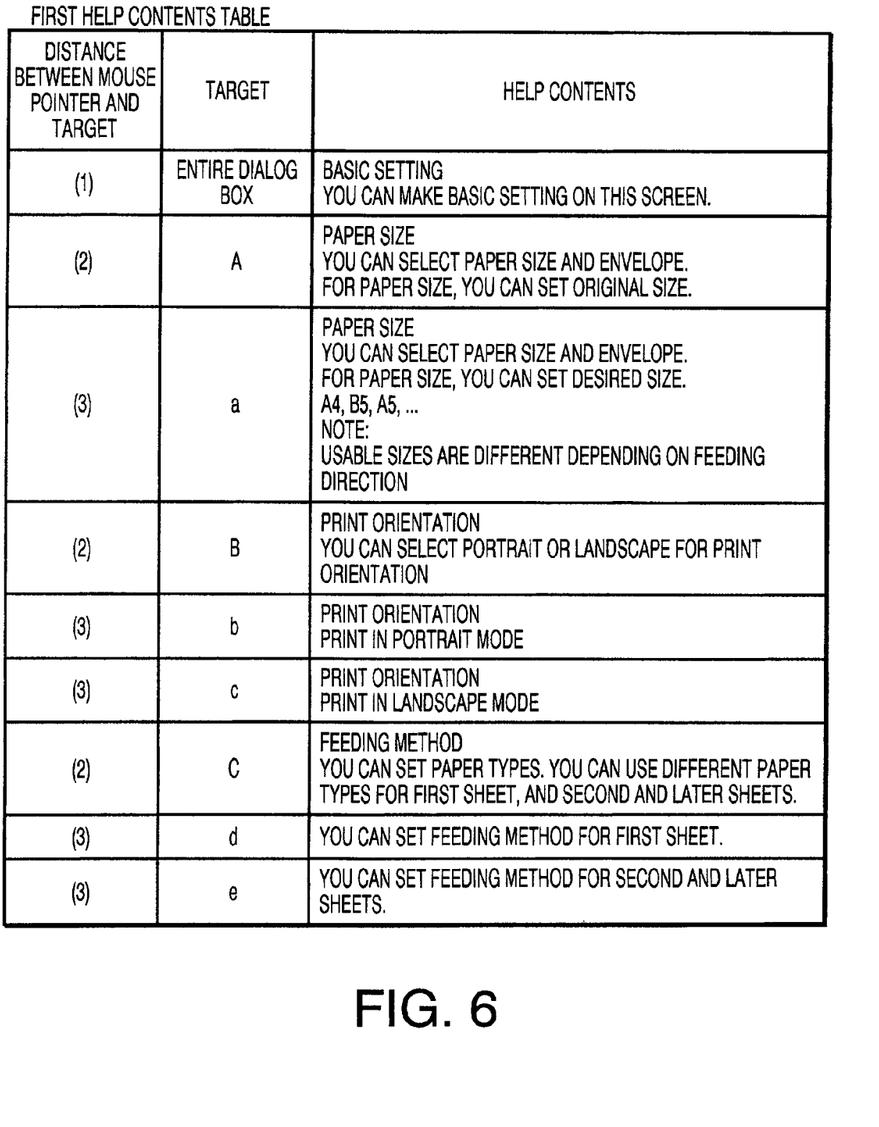
FIG. 6 shows a first help contents table used in the help information displaying process.

In S4 of FIG. 4, the process retrieves an item corresponding to the target selected in S3 from the first help contents able, and displays the retrieved content as help information in the vicinity of the mouse pointer P. According to the embodiment, the first help contents table is configured as shown in FIG. 6. In the first help contents table, contents to be displayed as help information when (1) the entire dialog box 500 is selected as the target, (2) one of the larger icons is selected as the target or (3) one of the small icons is selected as the target are registered. In S4, the corresponding one of the items of the first help contents table is selected at a position close to the mouse pointer P. It should be noted that an item of "a distance between the mouse pointer and target" in FIG. 6 is included for explanation purpose showing a correspondence with FIG. 10, which will be described later, and may be omitted in practice.

In S5 of FIG. 4, the process acquires the current position of the mouse pointer P and the position is set to a variable m2. In S6, the process calculates a difference m1−m2 of the positions of the mouse P represented by m1 and m2 described above. The calculated difference is represented by M. In S7, the process judges whether the mouse pointer P is substantially unmoved based on whether the difference M of the positions of the mouse pointer P is less than a predetermined fixed distance X. If M≧X, (S7: NO), the process proceeds to S8, where the process selects the target (icon) for which the help information is displayed based on the positions m1 and m2.

Figure 7:
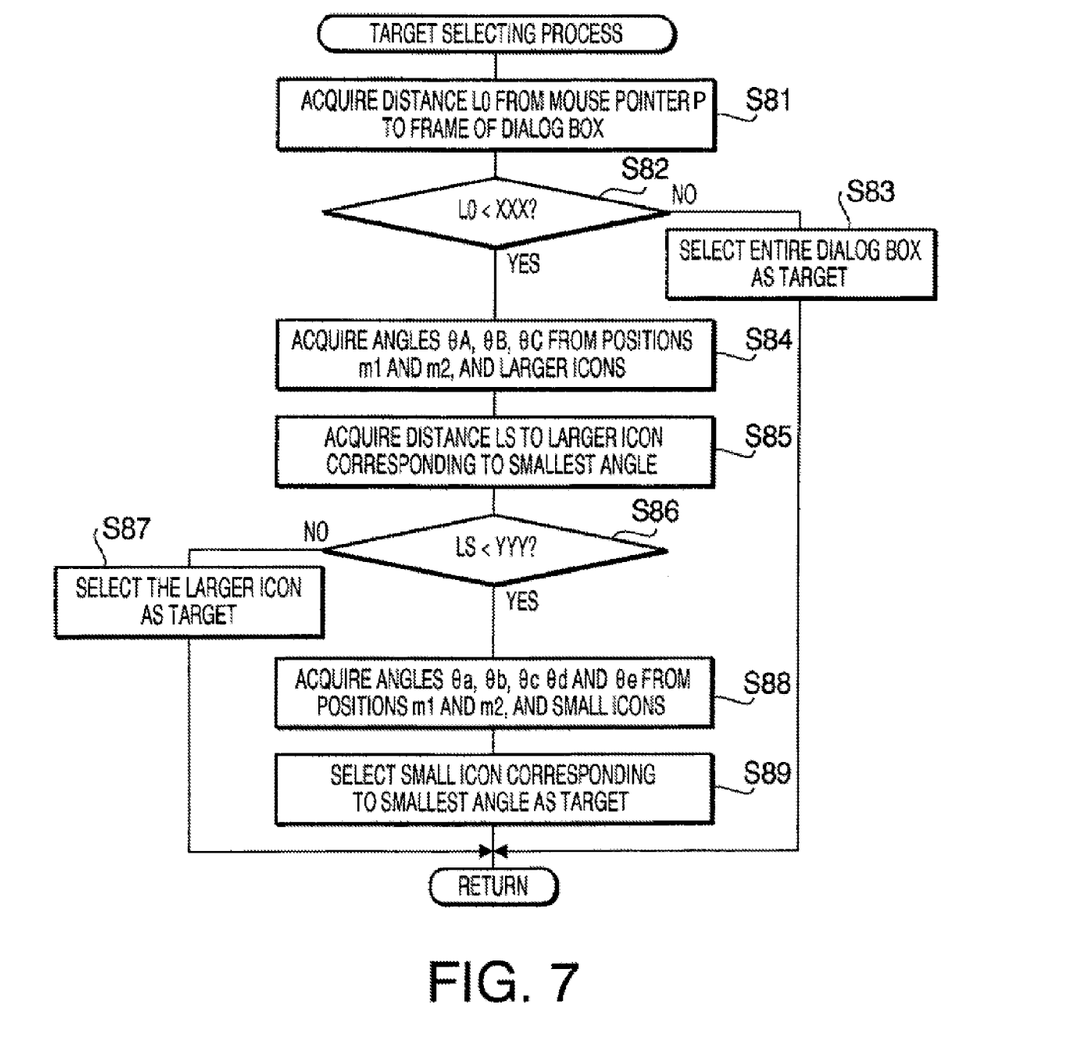
FIG. 7 is a flowchart illustrating a process for selecting the target based on a position and a moving direction the mouse pointer.

FIG. 7 is a flowchart illustrating a process executed in S8 of FIG. 4 in detail. When the process shown in FIG. 7 is started, the process firstly acquires a distance between the mouse pointer P and the frame of the dialog box 500, and set the distance to a variable L0 in S81. In S82, the process judges whether the distance L0 is less than a predetermined fixed value XXX. If L0≧XXX (S82: NO), the process selects the entire dialog box 500 as the target (S83), and the process proceeds to S9 of FIG. 4. In S9, a stop initiating time t0, which will be described later, is cleared and the process returns to S4.

If L0<XXX (S82: YES), the process proceeds to S84, where a moving direction of the mouse pointer P is detected. In S84, based on the positions m1 and m2, and each of the larger icons A, B and C, angles θA, θB and θC are acquired as described below.

Figure 8:
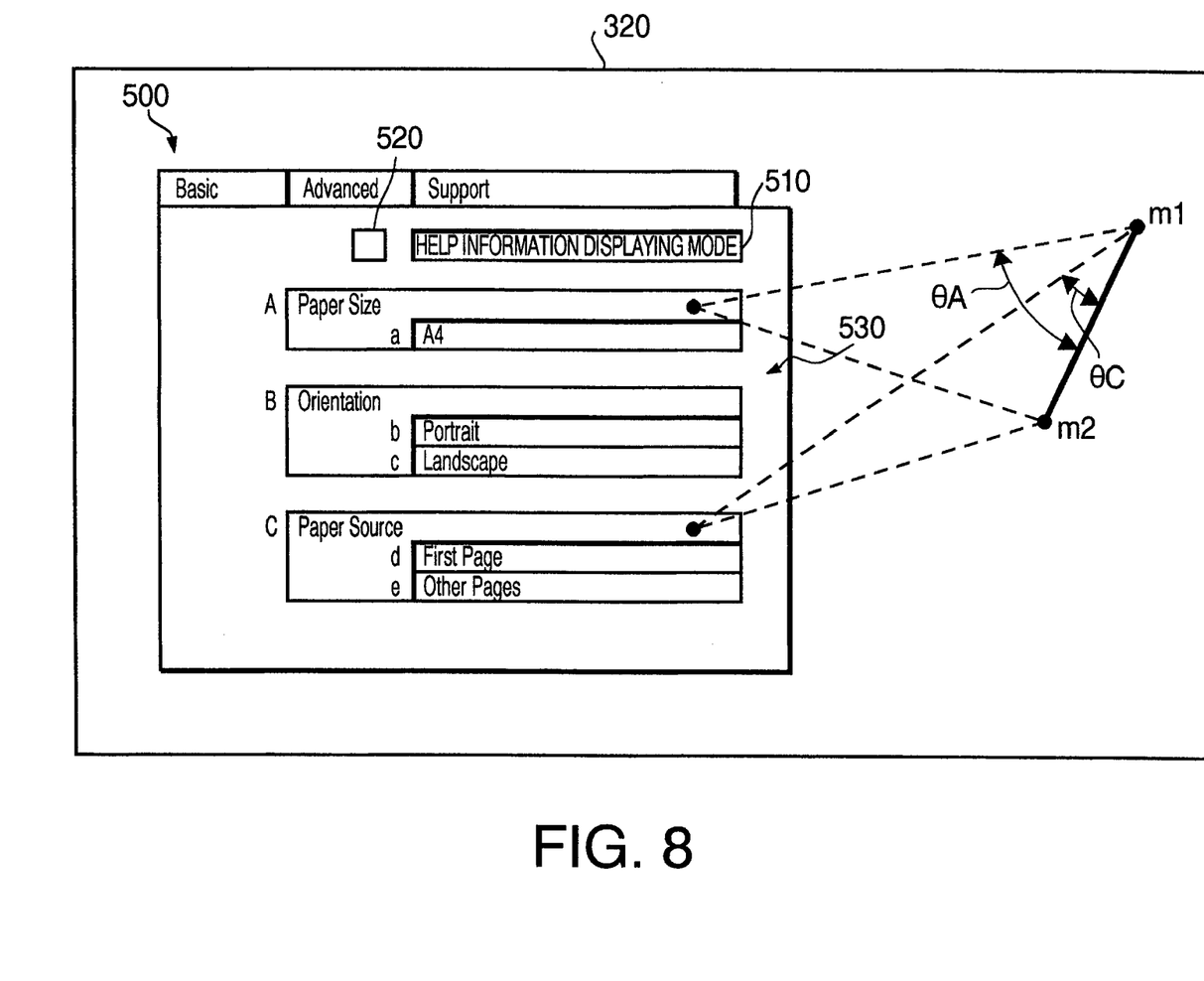
FIG. 8 illustrates how the target is selected in accordance with the embodiment of the invention.

As shown in FIG. 8, a triangle of which the apexes are on the positions of m1, m2 and each of the larger icons (in the example of FIG. 8, the apexes on the icons A and C are shown) is defined, and an apex angle corresponding the apex at the position m1 is acquired. Then, in S85, the process determines the larger icon corresponding to the triangle having the minimum apex angle corresponding to the position m1. In other words, the process determines the larger icon which is the closest to the mouse pointer P in terms of its moving direction. The distance between the mouse pointer P and the selected icon is set to LS.

In S86, the process judges whether the distance LS is less than a predetermined fixed value YYY. If LS≧YYY (S86: NO), the process proceeds to S87. In S87, the process selects the larger icon of which the LS is acquired in S85 as the target, and the process proceeds to S9. With the above configuration, the help information of the icon which is located in the moving direction of the mouse pointer P is displayed in S4.

If the process determines that M<X (S7: YES) (i.e., the mouse pointer P is substantially unmoved), the process proceeds to S11, where the process judges whether the stop initiating time t0 has been acquired. If the process determines that the stop initiating time t0 has not been acquired (e.g., the variable t0 has been cleared in S9) (S11: NO), the process acquires the current time as the stop initiating time t0, and proceeds to S13. In S13, the process acquires the current time t1. If the process has already acquired the stop initiating time t0 (e.g., the process has been executed S12 at least once) (S11: NO), the process proceeds from S11 to S13 and acquires the current time t1. In S14, the process calculates a unmoved time period T with a formula T=t1−t0. In S15, the process judges whether the unmoved time period T is longer than a predetermined fixed time period ZZZ.

If T≦ZZZ (S15: NO), the process returns to S1. If T>ZZZ (S1: YES), the process proceeds to S16. In S16, an item of a second help contents table corresponding to the target currently selected is displayed at the position of the mouse pointer P as help information. Then, the process proceeds to S1.

According to the embodiment, the second help contents table is configured as shown in FIG. 9. Similar to the first help contents table, the second help contents table stores contents to be displayed as the help information when (1) the entire dialog box 500 is selected, (2) each of the larger icons A-C is selected and (3) each of small icons a-e is selected. As shown in FIG. 9, each item includes detailed explanation in comparison with that of the first help contents table. In S16, the item stored in the second help contents table and corresponding to the selected target is displayed. It should be noted, however, the item of "a distance between the mouse pointer and the target" is for showing the correspondence with respect to items (1)-(3) of FIG. 10, which will be described later, and may be omitted in practice.

When the mouse pointer P is being unmoved (S7: YES), the process repeats steps S1-S7, S11, S13 and S14, displaying the help information based on the first help contents table, and measures the time period T (S4, S13 and S14). When the time period T exceeds the predetermined period ZZZ (S15: YES), the display of the help information is switched to the help information based on the second help contents table (S16).

Figure 10:
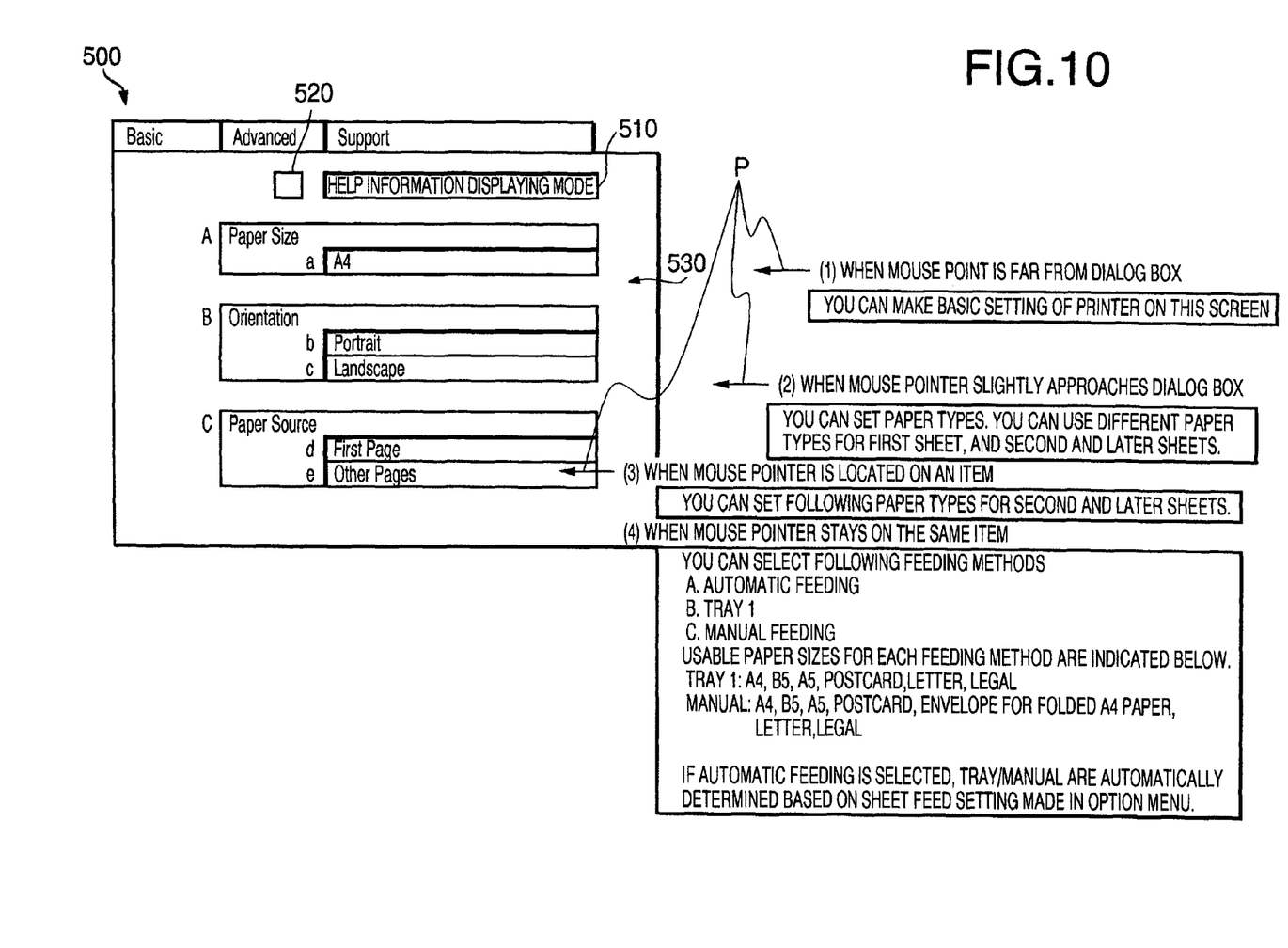
FIG. 10 shows how the help information is displayed on the display unit.

With the above configuration, the help information is displayed in a manner described below. For example, as illustrated in FIG. 10, when the mouse pointer P is relatively far from the dialog box 500 (S32: NO or S82: NO), the help information regarding the entire dialog box 500 is displayed (S33 or S83). If the mouse pointer P moves closer to the larger icon C (S82: YES and S86: NO), the help information regarding the larger icon C is displayed (S87). If the mouse pointer P is located on the small icon (e.g., the icon e) (S35: YES or S86: YES), the help information regarding the small icon is displayed (S37 or S89).

As described above, according to the embodiment, the displayed contents are changed as the mouse pointer P approaches the icon. Therefore, for a user who is not familiar with the operation and does not know which icon is to be clicked, since the mouse pointer P is not moved so quickly or substantially unmoved, the help information is displayed starting from one regarding the entire dialog box 500. On the contrary, for a user who is familiar with the operation and knows which icon is to be clicked, as the mouse pointer P is moved to the user-desired icon quickly, the help information regarding the entire dialog box 500 is displayed only a short period of time.

Further, (4) if the mouse pointer P is located on the same icon (e.g., the icon e) for a relatively long period (S15: YES), the displayed help information is switched from one based on the first help contents table to one based on the second help contents table. Therefore, for the user who is not familiar with the operation and uncertain whether or not to click the icon, detailed help information is displayed. As above, according to the above-described embodiment, the process judges the degree of skill of the user based on the moving status of the mouse pointer P, and displays the help information corresponding to the degree of the sill of the user. Therefore, operability is excellently improved.

It should be appreciated that the present invention need not be limited to the configuration described above and various modification may be made without departing from the scope of the invention.

For example, the help information may be displayed only when the mouse pointer P is located on one of the icons or at a position where a distance to one of the icons is less than the predetermined distance YYY, and the help information is switched from one based on the first help contents table to the one based on the second help contents table based on the unmoved period T. Alternatively, only one help contents table is used and the target is refined based on the distance from the icon.

Although the above-described embodiment is configured such that the help information is displayed at the position in the vicinity of the mouse pointer P. This may be modified such that the help information may be displayed at a predetermined position such as a lower area of the display screen.

What is claimed is:

1. An operation image displaying device, comprising:
    a displaying unit configured to display an operation image including operation input areas for inputting operations commands;
    a processor; and
    memory storing computer readable instructions that, when executed, cause the displaying device to:
    display a pointer, which points to a position on the displaying unit in accordance with an operation of a user;
    detect a distance between the pointer and one of the operation image and the operation input areas;
    detect a moving direction of the pointer;
    select one of information regarding the operation image and information regarding the operation input areas based on the detected distance and the detected moving direction, wherein the selected information is different from the pointer, the operation image and the operation input areas;
    display the information selected; and
    change a content of the displayed information based on a time period during which the pointer stays unmoved.

2. A method of displaying an operation image on a device, comprising the steps of:
    displaying the operation image including operation input areas for inputting operations commands;
    displaying a pointer, which points to a position on the operation image, in accordance with an operation of a user;

detecting a distance between the pointer and one of the operation image and the operation input areas;

detecting a moving direction of the pointer;

selecting information regarding the one of the operation image and the operation input areas based on the detected distance and the detected moving direction, wherein the selected information is different from the pointer, the operation image and the operation input areas;

displaying the information selected by the selecting step; and changing a content of the displayed information based on a time period during which the pointer stays unmoved.

3. A non-transitory computer readable recording medium storing instructions to cause a computer to execute a method of displaying an operation image on a device, the method including the steps of:

displaying the operation image including operation input areas for inputting operations commands;

displaying a pointer, which points to a position on the operation image, in accordance with an operation of a user;

detecting a distance between the pointer and one of the operation image and the operation input areas;

detecting a moving direction of the pointer;

selecting information regarding the one of the operation image and the operation input areas based on the detected distance and the detected moving direction, wherein the selected information is different from the pointer, the operation image and the operation input areas;

displaying the information selected by the selecting step; and changing a content of the displayed information based on a time period during which the pointer stays unmoved.

\* \* \* \* \*